US011308483B2

(12) United States Patent
Prabhu et al.

(10) Patent No.: US 11,308,483 B2
(45) Date of Patent: Apr. 19, 2022

(54) TOKEN SERVICE PROVIDER FOR ELECTRONIC/MOBILE COMMERCE TRANSACTIONS

(71) Applicant: PAYPAL, INC., San Jose, CA (US)

(72) Inventors: Nitin Prabhu, San Jose, CA (US); Dinesh Gomes, San Jose, CA (US); Ian Povey, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 783 days.

(21) Appl. No.: 14/984,210

(22) Filed: Dec. 30, 2015

(65) Prior Publication Data

US 2017/0061428 A1    Mar. 2, 2017

Related U.S. Application Data

(60) Provisional application No. 62/242,023, filed on Oct. 15, 2015, provisional application No. 62/209,714, filed on Aug. 25, 2015.

(51) Int. Cl.
    *G06Q 20/36*      (2012.01)
    *G06Q 20/40*      (2012.01)
    *G06Q 50/00*      (2012.01)

(52) U.S. Cl.
    CPC ..... *G06Q 20/3674* (2013.01); *G06Q 20/4014* (2013.01); *G06Q 50/01* (2013.01); *G06Q 2220/00* (2013.01)

(58) Field of Classification Search
None
See application file for complete search history.

(56) References Cited

U.S. PATENT DOCUMENTS 8,688,524 B1 * 4/2014 Ramalingam .......... G06Q 20/20
    705/16
2005/0216300 A1 * 9/2005 Appelman ............. G06Q 10/10
    705/319

(Continued)

FOREIGN PATENT DOCUMENTS

CN      102017578 A      4/2011
CN      103718200 A      4/2014

(Continued)

OTHER PUBLICATIONS

Kosir, "Open vs. Closed Loop Mobile Payments", (Year: 2015).*

(Continued)

*Primary Examiner* — Steven S Kim
*Assistant Examiner* — Jason B Fenstermacher
(74) *Attorney, Agent, or Firm* — Haynes and Boone, LLP

(57) ABSTRACT

In some embodiments, a verification system includes a memory storing a common identifier that identifies a user. The system may also include one or more hardware processors coupled to the memory and configured to read instructions from the memory to perform the steps of: receiving a token associated with a request to complete a transaction with an environment; determining the common identifier associated with the token, the common identifier being associated with an identifier of the merchant, an identifier of the user requesting the transaction, and a funding instrument associated with the user; and determining, based on information associated with the common identifier, whether to approve the transaction.

20 Claims, 15 Drawing Sheets

(56) References Cited

U.S. PATENT DOCUMENTS

| | | | |
|---|---|---|---|
| 2008/0148235 A1 | 6/2008 | Foresti et al. | |
| 2009/0240911 A1* | 9/2009 | Yamada | G06F 3/0631 |
| | | | 711/171 |
| 2010/0030697 A1* | 2/2010 | Goodrich | G06Q 40/00 |
| | | | 705/75 |
| 2010/0250687 A1* | 9/2010 | Smith | G06Q 20/10 |
| | | | 709/206 |
| 2012/0310838 A1 | 12/2012 | Harris et al. | |
| 2013/0198035 A1* | 8/2013 | Bogaard | G06Q 20/382 |
| | | | 705/26.35 |
| 2013/0212007 A1 | 8/2013 | Mattsson et al. | |
| 2013/0212666 A1 | 8/2013 | Mattsson et al. | |
| 2013/0232159 A1* | 9/2013 | Daya | G06F 16/337 |
| | | | 707/758 |
| 2014/0039990 A1 | 2/2014 | Georgi | |
| 2014/0081844 A1* | 3/2014 | Hosp | G06Q 50/01 |
| | | | 705/39 |
| 2014/0089189 A1* | 3/2014 | Vasireddy | G06Q 20/4016 |
| | | | 705/44 |
| 2014/0330721 A1* | 11/2014 | Wang | G06Q 40/04 |
| | | | 705/44 |
| 2014/0344149 A1 | 11/2014 | Campos | |
| 2015/0032625 A1 | 1/2015 | Dill et al. | |
| 2015/0032627 A1 | 1/2015 | Dill et al. | |
| 2015/0112864 A1* | 4/2015 | Wallaja | G06Q 20/12 |
| | | | 705/44 |
| 2015/0112870 A1* | 4/2015 | Nagasundaram | G06Q 20/401 |
| | | | 705/67 |
| 2015/0142595 A1* | 5/2015 | Acuna-Rohter | G06Q 30/06 |
| | | | 705/21 |
| 2015/0186871 A1 | 7/2015 | Laracey | |
| 2015/0199689 A1 | 7/2015 | Kumnick et al. | |
| 2015/0254665 A1 | 9/2015 | Bondesen et al. | |
| 2016/0005042 A1* | 1/2016 | Tervo | G06Q 20/388 |
| | | | 705/67 |
| 2016/0092869 A1 | 3/2016 | Salama et al. | |
| 2017/0109741 A1 | 4/2017 | Helman et al. | |

FOREIGN PATENT DOCUMENTS

| | | |
|---|---|---|
| CN | 104737189 A | 6/2015 |
| WO | WO 2012/075417 | 6/2012 |
| WO | WO 2014/117095 | 7/2014 |
| WO | WO 2015/0233305 | 2/2015 |
| WO | WO 2017/035399 | 3/2017 |

OTHER PUBLICATIONS

Korhan, "What Your Business Needs to Know About Social Graphs", (Year: 2011).*

Kosir, "Open v. Closed Loop Mobile Payments", May 21, 2015 (Year: 2015).*

Kosir, Open vs. Closed Loop Mobile Payments, ClearBridge Mobile (Year: 2015).*

Kosir—Open vs. Closed Loop Mobile Payments (May 21, 2015) (Year: 2015).*

* cited by examiner

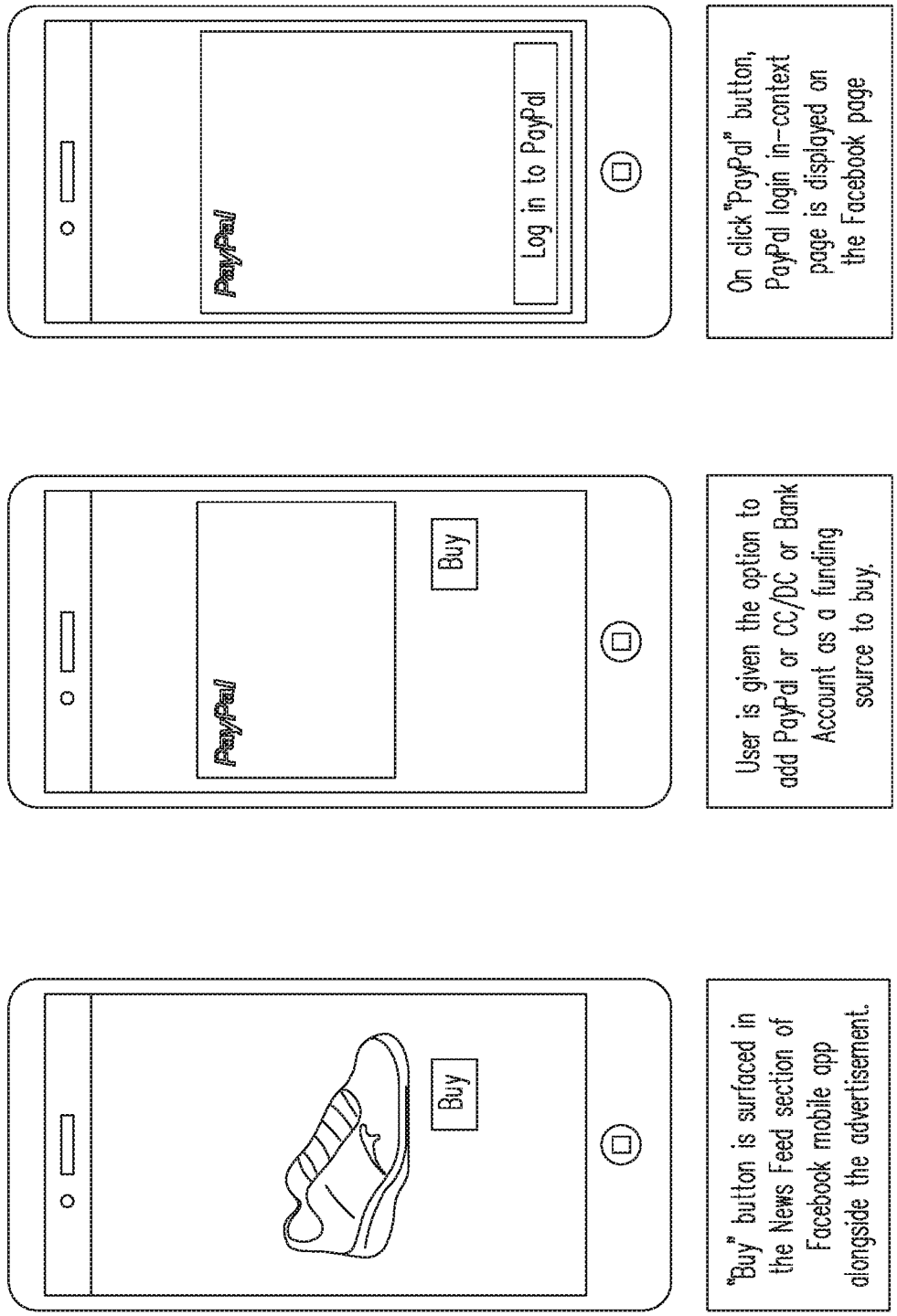

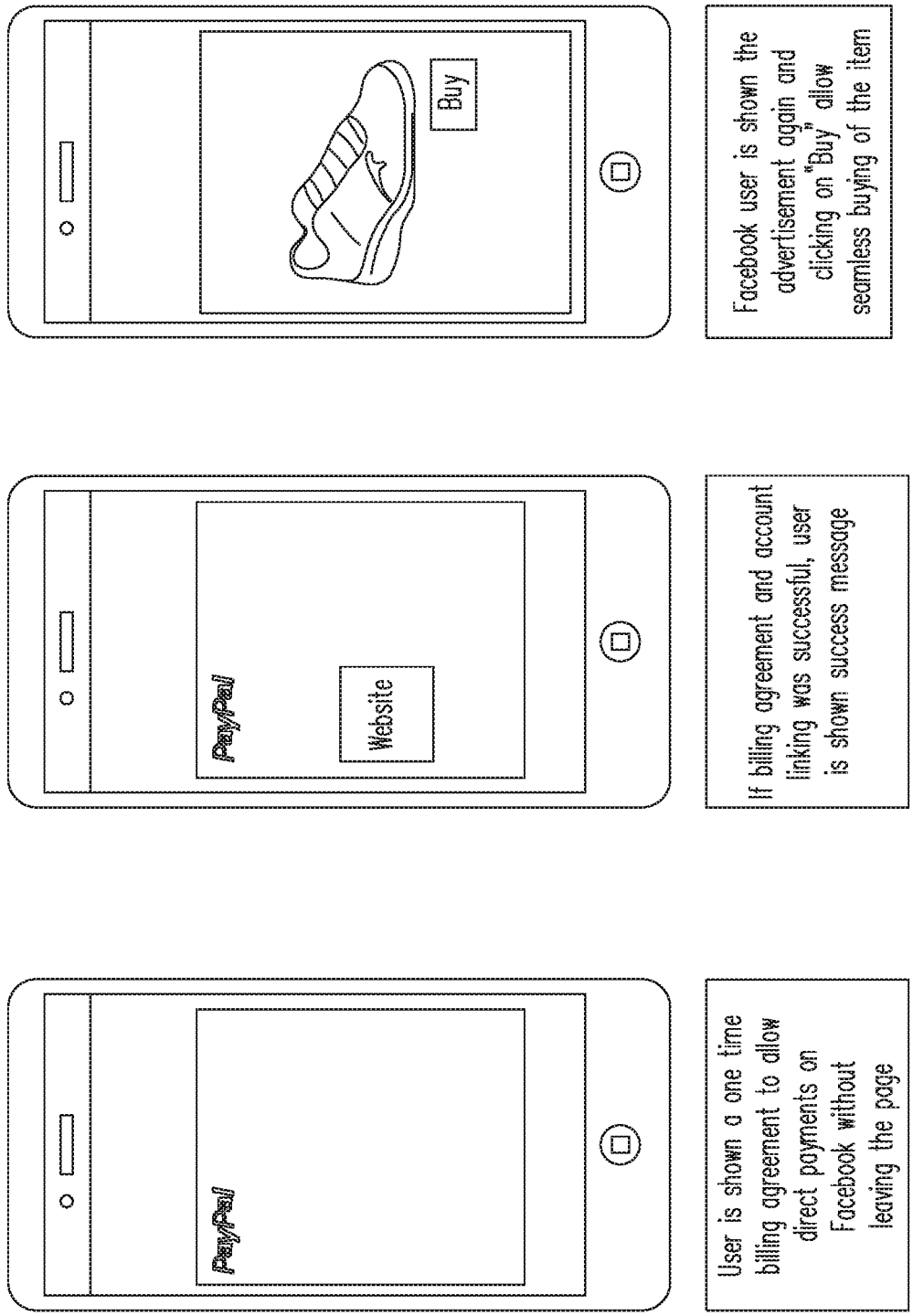

TOKEN SERVICE PROVIDER FOR ELECTRONIC/MOBILE COMMERCE TRANSACTIONS

CROSS-REFERENCE TO RELATED APPLICATIONS

The present application claims the benefit of U.S. Provisional Application No. 62/209,714 entitled "TOKENIZATION FOR ELECTRONIC COMMERCE," filed Aug. 25, 2015, and U.S. Provisional Application No. 62/242,023 entitled "TOKEN SERVICE PROVIDER FOR ELECTRONIC/MOBILE COMMERCE TRANSACTIONS," filed Oct. 15, 2015, each of which is incorporated herein by reference.

BACKGROUND

Field of the Invention

The present disclosure generally relates to systems and methods for processing a transaction using an identifier that uniquely identifies a user.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal®, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Many payment transactions enabled by online or mobile payment service providers such as, for example, retail purchases, payment transactions, and the like, are made electronically using electronic devices, such as mobile phones or mobile computing devices. For example, a consumer may install a payment application provided by the payment service provider on his or her mobile device to facilitate payments to various merchants or recipients. An online or mobile payment process utilizing the payment application typically includes user authentication that requires a user to enter a login identifier (ID) and/or a password to authenticate the user.

While inventive aspects of the present inventions are detailed in the description and claims that follow, exemplary design choices and concrete realizations thereof will be appreciated by persons of skill in the art having access to the present disclosure in view of particulars disclosed in the follow reference documents:

Overall Architecture (Appendix A),
4—Requirements & Usecases (Appendix B),
6—Transaction Flows & APIs (Appendix C),
12—Compliance (Appendix D), and
15—PayPal Tokenization for Ecommerce (Appendix E).

BRIEF DESCRIPTION OF THE FIGURES

FIGS. 2A-2B are example snapshots displayed on a mobile device illustrating the linking of the user's account to financial information.

Figure 1:
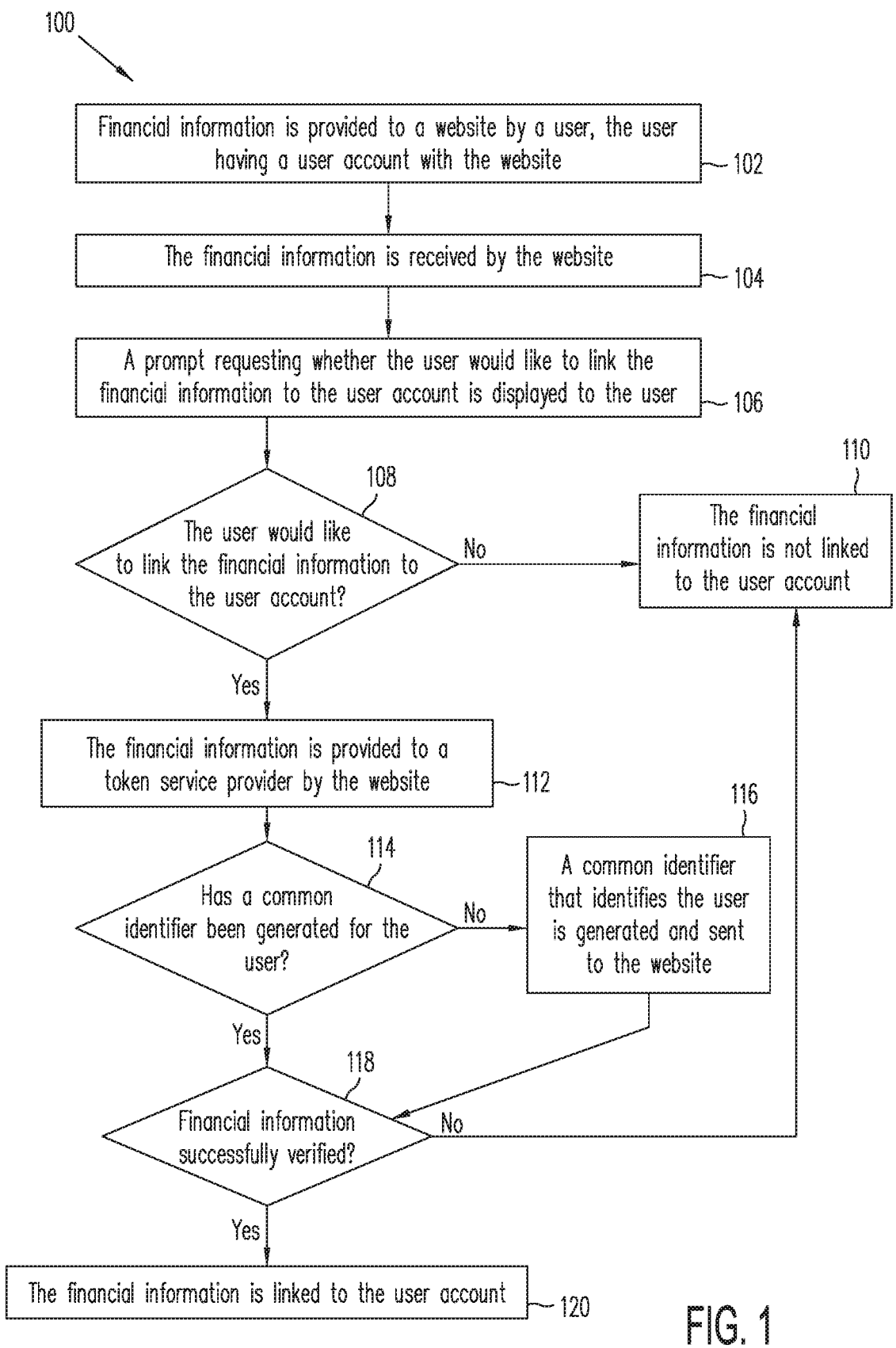
FIG. 1 is a flowchart illustrating an embodiment of a method of linking a common identifier (ID) to a user account and financial information provided by the user.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may be provided to use a common ID to verify a transaction requested by the user. In some embodiments, a verification system includes a non-transitory memory storing a common identifier that identifies a user. The system may also include one or more hardware processors coupled to the memory and configured to read instructions from the memory to perform the steps of: receiving a token associated with a request to complete a transaction with a merchant; determining the common identifier associated with the token, the common identifier being associated with an identifier of the merchant or website, an identifier of the user requesting the transaction, and a funding instrument associated with the user; and determining, based on information associated with the common identifier, whether to approve the transaction. As will be discussed further below, the verification system may construct a social graph to determine the riskiness of approving the transaction.

A growing number of users interact with some type of social media platform, operating system, or other user environments. Users may communicate with their friends and a wider population by, for example, posting comments on a social media website. In this developing ecosystem, users typically share information on social media websites that are viewable by others. Additionally, users may interact more with social media websites than with their banks or financial institutions.

A user may be uneasy about providing their personal information (e.g., date of birth, mother's maiden name, or social security number) and financial information to a social media website. It may be more acceptable for the user to post information about herself on a social media website. Social media websites allow a user to connect with other users and post comments, which may be visible to the public. In some embodiments, the user's social characteristics/identity, relationships (e.g., friends on the social media website), and information (e.g., user's city of residence, places traveled) provided to the social media website are used to create a map of the user's life history. The user's life history may be illustrated in a social graph and may be more accurate and up-to-date regarding the user's habits and personality than information that is typically used to identify a user (e.g., social security number or name, which is typically given to the user at birth). Accordingly, it may be desirable to leverage this information that is provided by users on social media websites to provide services and resources to users. Examples of services include, but are not limited to, financial services, identity enablement services, and Internet of Things (IoT).

By using information provided by the user on a social media website, it may be unnecessary to request information from the user. For example, rather than ask the user where she lives (e.g., United States), this information may be readily available on her social media profile. In this example, if the user attempts a transaction while in another country (e.g., in India), this transaction may be identified as a high-risk transaction in terms of transaction location. If, however, the user has posted on her social media profile that she is in India along with a photograph of herself in front of the Taj Mahal, the transaction may be identified as a low-risk transaction in terms of transaction location. Additionally, rather than ask the user where she works, this information may be readily available on her social media profile. The likelihood of a user telling the truth on her profile in terms of such information may be perceived as high. Additionally, rather than ask the user her date of birth, this information may be readily available on her social media profile because her friends are wishing her a happy birthday on her social media profile.

A trusted framework may be created based on the information associated with users based on their social media profiles to more accurately identify users and their habits. Additionally, the more connections the user has to other users (e.g., friends on FACEBOOK), the higher the user's reliability score may be. This information may be used in electronic commerce to prevent fraud and high-risk activities.

A common identifier (ID) construct may be created and based on the user's experience as detailed on one or more social media platforms (e.g., the user's social media profiles), by one or more operating systems, or other user environments. A common ID is an identifier that uniquely identifies the user with respect to a particular platform(s) (e.g., a social media platform, operating system, or other user environments). In some aspects, a common ID may be used in relation to banking or financial services to identify the user as a consumer of a good or service. A user may also be referred to as a consumer. The common ID may be transparent to the user.

The common ID may indicate the user's consent for an entity (e.g., social media website, bank, etc.) to perform a specific activity or set of activities in a given environment. For example, the common ID may indicate the user's consent for an entity (e.g., a social media website) to use his credit card to make purchases. In another example, the common ID may indicate the user's consent for a bank to allow him to use his points to pay for his utility bill. In another example, the common ID may indicate the user's consent to allow his refrigerator to order groceries (e.g., milk) from his grocery store when the refrigerator is running low on particular items (e.g., milk). In another example, the common ID may indicate the user's consent to allow his car to download the latest music of his choice from particular music streaming websites (e.g., ITUNES or PANDORA) every week. In another example, the common ID may indicate the user's consent to identify himself at particular locations (e.g., gym, hotel, etc.) without carrying a keycard that is normally used to access or identify himself at the locations. The common ID may enable users to experience seamless user experiences with security and context based data sharing with appropriate controls. Additionally, a token may represent a manifestation of the common ID in real time that allows for the enablement of specific transaction(s) in the context and parameter set(s) as defined by the user, environment, and/or token service provider, beforehand or in real time.

A token may be an open loop or closed loop identifier that serves as a proxy for conveying the user's consent for a particular transaction and for a specific environment. The particular transaction may be a financial or a non-financial transaction corresponding to a specific interaction for that specific environment. An open loop may refer to an identifier that is sufficiently recognizable to be routable by existing routing networks (e.g., credit card company networks) back to the token service provider (e.g., PayPal) or other such appropriate ecosystems based on the context of the transaction. A closed loop may refer to an identifier that is recognized only by the token service provider or limited ecosystem based on business needs.

Tokens may be issued in several different scenarios. In some examples, a token may be issued for online or offline payments. A token may serve as a proxy for a financial instrument or an account with the token service provider. The token may also be used for payment or non-payment purposes.

A token service provider may issue a token and define a set of parameters surrounding the token, which can restrict or permit the access and use of the token. One or more parameters of the set of parameters may include, but are not limited to, a card network (e.g., the name of a credit card company's network); a time to live, which is the period from the moment of issuance until the token expires or is no longer valid (e.g., 30 seconds, 1 minute, 8 hours, 2 days, 1 year, etc.); scheme/BIN (e.g., debit, credit, prepaid, or token); currency accepted (e.g., US dollars, Euro, Canadian dollar, Vietnamese dong, etc.); merchant type (MCC) (e.g., digital goods, travel, online retail store, etc.); merchant information, which may include a choice of merchant preferences such as funding sources, brands, closed loop, dollar limits, etc.; merchant location, which may be the country in which the merchant is registered (e.g., United States or Canada), terminal location (e.g., Global Positioning System coordinates or registered card reader terminal location), or whether the merchant is online only or offline only; consumer location radius (e.g., GPS coordinates of the user's mobile device); security features (e.g., cryptogram required or step-up authentication required); routing mechanism (e.g., open or closed loop); type of interaction, which may include funding (e.g., private label credit card (PLCC), points, cards, or banks), identity (e.g., access to hotel, gym or car or other environments that need identity verification), and contextual information (e.g., address, etc.); and amount (e.g., the amount that can be used for payment authorization using the token).

The scope of the token may be based on various factors. For example, the scope of the token may be based on consumer preference, which may be based on the knowledge or data about the consumer's profile or preference(s). In such an example, based on the consumer funding plan, certain types of bins (e.g., PLCC bin or a particular platinum credit Bin) may be identified and used for the consumer. In another example, the scope of the token may be based on whether the consumer has a card from a particular credit card company on file. In such an example, the token service provider may issue a token that can be routed over the particular credit card company's network. In another example, the scope of the token may be based on whether the consumer has a closed loop gift card in her wallet. In such an example, the token service provider may issue a token that can be routed over a supporting network.

In another example, the scope of the token may be based on the merchant's/partner's preference(s). A token service provider may issue a token with a particular BIN or scheme based on a preference expressed by a merchant or a partner of the token service provider. A merchant preference may include whether the merchant does or does not accept all credit card brands. If, for example, the merchant only accepts credit cards from particular companies, the token service provider may issue an open loop token for one or more of those particular companies based on the merchant identifier (ID) of the merchant. In another example, if a merchant offers a PLCC, the token service provider may send a semi open PLCC token. In another example, if a merchant is located in a specific country, the token service provider may issue a token that is accepted by a network in the country.

In another example, the scope of the token may be based on the preference(s) of the token service provider. The token service provider may modify the scope of a token to maximize the meeting or exceeding of business objectives or business needs (e.g., lower cost, lower risk, higher revenue, etc.). For example, the token service provider may issue a token with a more favorable interchange to merchants or partners based on preferred pricing details. In another example, if a consumer desires to pay with a closed loop gift card, the token service provider may issue a click fee based token to save on interchange. In another example, for a high risk merchant category or consumer, the token service provider may decline issuance of the token itself based on past behavior of the consumer.

In another example, the scope of the token may be based on regulatory need. The token service provider may issue tokens with its scope adjusted to meet country specific regulatory or compliance needs. For example, if a particular county requires the use of a cryptogram with the token, the token service provider may issue a token having a cryptogram when the token service provider issues a token to an entity located in that particular country. In another example, if a regulatory based limit on the amount a token can front exists, the token service provider may abide by this regulatory based limit when issuing tokens. In another example, the Durbin Amendment in the United States requires the Federal Reserve to limit fees charged to retailers for debit card processing. Accordingly, the token service provider may switch the type of token being issued if the consumer is using a regulated debit card in her wallet so that certain rates are not charged to the merchant.

It should be understood that the above list of factors affecting the token scope includes non-limiting examples and other factors are within the scope of the present disclosure. The token service provider may create and issue one or more tokens that can support special use cases. For example, the token service provider may issue a token that can be provisioned to be used on a wearable wristband that can be used by the user to "tap and pay." For example, the user may tap the wearable wristband against a scanner, which uses the token associated with the wearable wristband for payment. In another example, the token service provider may issue a token that can be provisioned to a wearable fitness device that is provisioned to open a gym door. In another example, the token service provider may issue a token that can be provisioned to a near field communication (NFC) device to be used to identify a customer to provide keyless access to an NFC-reader enabled door. In another example, the token service provider may issue a token that can be used at a casino that ties charges made on the floor directly to the consumer's room account. In another example, the token service provider may issue a token that simulates a reloadable transit experience for taking mass transit. In such an example, the consumer may load the card with X dollars, which satisfies Y number of trips, and at the commencement of a trip, the consumer taps her card to pay for the trip.

Figure 15:
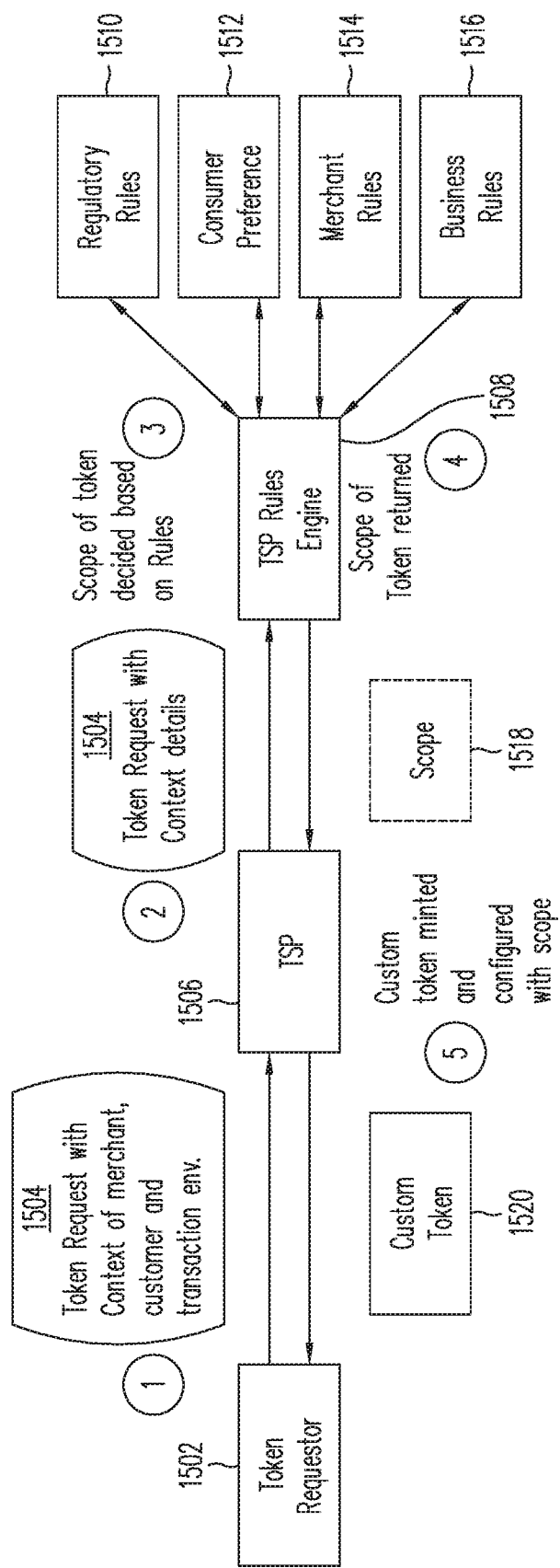
FIG. 15 is an example process flow for issuing one or more tokens having a particular scope based on one or more rules.

FIG. 15 is an example process flow for issuing one or more tokens having a particular scope based on one or more rules. A token service provider may dynamically issue tokens with the required scope to meet particular use cases. In some examples, the token service provider may be preloaded with rules on token issuance logic. The rules may be based on, for example, at least one of consumer preference(s), regulatory needs, the token service provider's needs, or other needs. In FIG. 15, a token requestor 1502 sends a token request 1504 to a token service provider 1506. Token requestor 1502 may include details that are defined as being a "context" of the token request. The "context" may include basic information about token requestor 1502, the customer, the transaction environment, token needs, location, etc. In FIG. 15, token request 1504 includes a context of a merchant, a context of a customer, and a transaction environment.

Token service provider 1506 may, among other operations, call a token service provider rules engine 1508 that uses the context associated with the token request 1504 to identify relevant rules to apply to a token. The relevant rules may be used to determine a scope with which the token should be issued. Token service provider 1506 sends token request 1504 to token service provider rules engine 1508. Token service provider rules engine 1508 may determine a scope of the token based on one or more rules. For example, token service provider rules engine 1508 may determine the scope of the token based on regulatory rules 1510, consumer preference(s) 1512, merchant rule(s) 1514, and business rule(s) 1516. These rules may be stored in a database that is accessible by token service provider rules engine 1508. Token service provider rules engine 1508 may determine a scope of the token 1518 based on the one or more rules, and return scope of the token 1518 to token service provider

1506. Token service provider 1506 may receive scope of the token 1518 and create a custom token 1520 that is configured with scope of the token 1518. In some examples, customer token 1520 is based on a combination of scope of the token 1518 and a token format associated with token requestor 1502. Token service provider 1506 may then transmit custom token 1520 to token requestor 1502 for token requestor 1502 to use.

The common ID may be an attribute that is used to uniquely represent a relationship between a user and a commerce partner (e.g., social media website) for a specific funding instrument. The common ID may be an internal construct and can be used by commerce partners of the token service provider. The common ID may be used to aggregate transactions and for account management. The common ID may be defined as the combination of a merchant/social commerce partner identifier, and/or the user identity of the user on the partner and/or the funding instrument/wallet information of the user. The exact combination or configuration differs by use case and is driven by product design and business need. One or more tokens may be issued against a common ID.

Unless specifically stated otherwise, as apparent from the following discussion, it is appreciated that throughout the description, discussions utilizing terms such as "receiving", "sending", "storing", "providing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a flowchart illustrating an embodiment of a method 100 of linking a common ID to a user account and financial information provided by the user. Method 100 is not meant to be limiting and may be used in other applications other than the payment applications discussed below. Method 100 includes steps 102-122.

In a step 102, financial information is provided to a website by a user, the user having a user account with the website. In an example, the website may be a social media website (e.g., FACEBOOK, TWITTER, PINTEREST, etc.) and the user has attempted to purchase an item displayed on the social media website. Trademarks are the property of their respective owners. The social media website may request financial information (e.g., the user's credit card information, debit card information, or account information associated with a token service provider) from the user to buy the item. The financial information may include the user's funding source to buy the item. The funding source may also be referred to as a funding instrument.

At a step 104, the financial information is received by the website. In an example, the social media website may receive the user's credit card information, debit card information, or account information associated with a token service provider. At a step 106, a prompt requesting whether the user would like to link the provided financial information to the user's account is displayed to the user. If the user's account is linked to the financial information, the user may purchase items that are displayed on the website and use the financial information provided by the user to do so without leaving the website, even though the items are provided by an entity different from the website provider.

At a step 108, it is determined whether the user would like to link the financial information to the user account. The website may receive a user input to indicate whether the user would like to link the financial information to the user account. If the user input indicates that the user would not like to link the financial information to the user's account, process flow proceeds to a step 110, in which the financial information is not linked to the user account. When the user's behavior is tracked, the website may perform checks to ensure that the appropriate consent from the user is given. In some examples, the website stores or accesses the most up-to-date information regarding best practices regarding privacy and finances to abide by the appropriate laws. In such an example, the website uses the data only for the purposes for which consent has been sought, and given by the user.

In contrast, if the user input indicates that the user would like to link the financial information to the user account, process flow proceeds to a step 112, in which the financial information is provided to a token service provider by the website. The token service provider may receive the financial information. At a step 114, it is determined whether a common ID has been generated for the user. In an example, the token service provider may determine whether a common ID has been generated for the user. If a common ID has not been generated for the user, process flow proceeds to a step 116, in which a common ID that identifies the user is generated and sent to the website. The token service provider may generate the common ID and send it to the website for association with the user. The website may receive the common ID and store it for future reference. When the user attempts to make another transaction in the future, the website may provide this common ID to the token service provider so that the token service provider can track the user's behavior.

From step 114 or step 116, process flow proceeds to a step 118, in which it is determined whether the financial information has been successfully verified. In an example, the token service provider verifies the financial information. In some examples, the token service provider performs risk analysis on the financial information provided by the user. For example, the token service provider may determine whether a credit card or debit card specified in the financial information may be stolen or may be involved in fraudulent activity.

If the financial information fails verification (e.g., the risk of fraudulent activity associated with the financial information provided by the user is high), process flow proceeds to step 110, in which the financial information is not linked to the user account. In contrast, if the financial information is successfully verified, process flow proceeds to a step 120, in which the financial information is linked to the user account. If the user's account is linked to the financial information, the user may purchase a good or service and use her linked financial information to pay for the good or service on the website without being prompted to enter her financial information again or leaving the website to make such a purchase.

A common ID may be associated per user and per website (e.g., social media platform, operating system, or other user environments). In some examples, the token service provider generates a new common ID for a user for each account that the user has with a particular website, and associates the user's behavior on a particular website with the associated common ID. In such an example, a particular website may not want the token service provider to use the information provided by the user on its website to be used for and provided to other websites, and the particular website may instruct the token service provider to not share any information about the user that is provided by the website with others.

It may be desirable for the token service provider to track the user's activity with respect to each social media website with which the user interacts because the user may use different websites for different things. For example, a particular website may be used by the user to interact with friends, another website may be used by the user for shopping, etc. In some examples, the information may be aggregated based on appropriate approvals by all parties and may be used for only the purposes defined and agreed upon by all the parties.

In some examples, the token service provider aggregates the information and activity associated with a common ID across websites for a particular user. In an example, a common ID may utilize and incorporate data from different social media websites with which the user interacts. The token service provider may track the different common IDs associated with a user and perform risk analysis based on this aggregated information. For example, if a login to a user account occurs in a country different from the country in which the user resides, the token service provider may determine that activity or transactions associated with the user's other accounts (e.g., at different websites) may be fraudulent. In this example, the token service provider may leverage the information that it has from different sources to provide a more secure environment for the user, merchants, and financial institutions.

It should be understood that additional processes may be performed before, during, or after steps 102-122 discussed above. It is also understood that one or more of the steps of method 100 described herein may be omitted, combined, or performed in a different sequence as desired.

FIG. 2 are example snapshots displayed on a mobile device illustrating the linking of the user's account to financial information.

Figure 3:
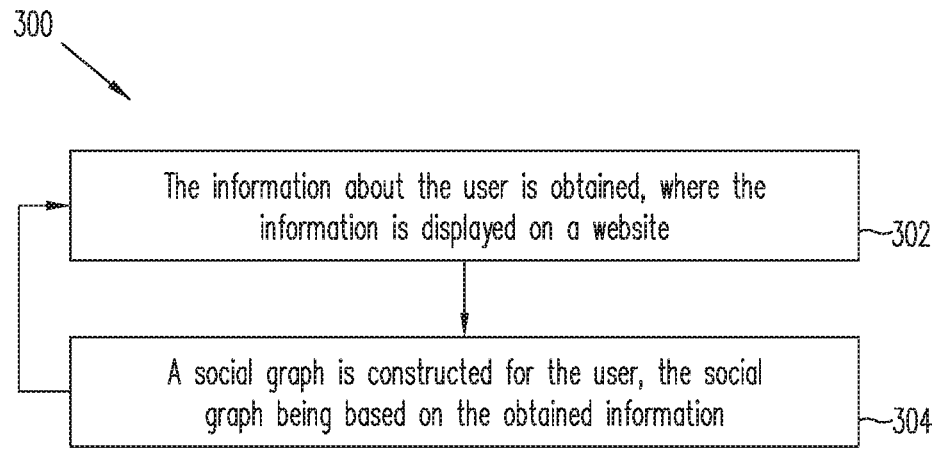
FIG. 3 is a flowchart illustrating an embodiment of a method of constructing a social graph.

FIG. 3 is a flowchart illustrating an embodiment of a method of constructing a social graph. Method 300 is not meant to be limiting and may be used in other applications other than the social media context. Method 300 includes steps 302 and 304. At a step 302, information about the user is obtained, where the information is displayed on a website. In an example, the token service provider may obtain information about the user by receiving updates from the website. The token service provider may also search for information displayed on the website to obtain more information about the user. For example, the token service provider may search for keywords (e.g., "Happy Birthday!") on a user's website profile to determine the user's birthday. Additionally, the token service provider may determine particular fields displayed on the website (e.g., "work," "where I went to school," etc.) and determine the values of those fields to collect more information about the user.

At a step 304, a social graph is constructed for the user, the social graph being based on the obtained information. In an example, the token service provider may aggregate the information obtained about the user and construct the social graph. The social graph is in the context of the user and is based on information about the user. The social graph may be based on information provided by the user and others (e.g., the user's friends or other connections) that is displayed on the user's social media profiles.

The token service provider may incorporate the activity in the social graph into the user's common ID. Additionally, the token service provider may continually update the user's social graph such that it includes recent activity associated with the user. For example, a node in the social graph may indicate the user's current location. If the user has "checked into" a restaurant located in Chicago with the comment, "I love the windy city!", the token service provider may determine that the user has left her residential city of San Jose, Calif. and is presently in Chicago, Ill. Accordingly, the token service provider may update the user's social graph to reflect the user's new current location in Chicago, Ill. If the token service provider receives a request for a transaction in Chicago attempted by the user, the token service provider may determine that the location of the transaction is low risk because the token service provider has determined that the user is in Chicago. If, however, the token service provider receives a request for a transaction in Lake Tahoe, Calif. attempted the user, the token service provider may determine that the location of the transaction is high risk because the user's current location and the location of the transaction do not match.

It should be understood that additional processes may be performed before, during, or after steps 302 and 304 discussed above. It is also understood that one or more of the steps of method 300 described herein may be omitted, combined, or performed in a different sequence as desired.

Figure 4:
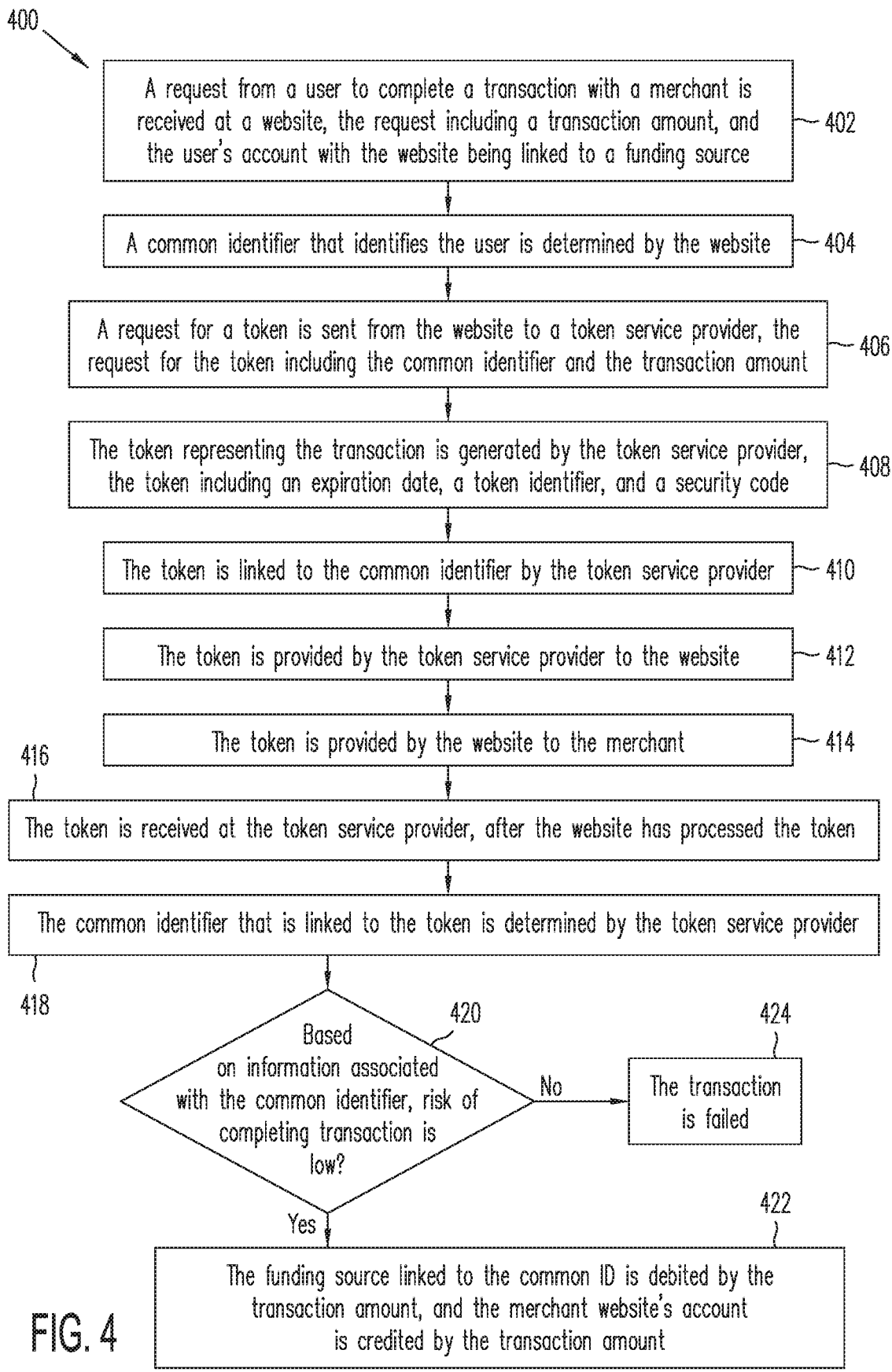
FIG. 4 is a flowchart illustrating an embodiment of a method of using a common ID to verify a transaction requested by the user, after the user's account has been linked to the user's financial information.

FIG. 4 is a flowchart illustrating an embodiment of a method of using a common ID to verify a transaction requested by the user, after the user's account has been linked to the user's financial information. Method 400 is not meant to be limiting and may be used in other applications other than the payment applications discussed below. Method 400 includes steps 402-424.

In a step 402, a request from a user to complete a transaction with a merchant is received at a website, the request including a transaction amount, and the user's account with the website being linked to a funding source. In some examples, the user browses a social media website and sees an item for sale displayed on the website's newsfeed. The user may click a "Buy" button near the item to attempt to purchase it. In a step 404, a common ID that identifies the user is determined by the website. The website may search a database for the common ID that identifies the user based on, for example, the user's username and password with the website.

If the website has a common ID that identifies the user, the website may request from the token service provider a token associated with the common ID and the user. In a step 406, a request for a token is sent from the website to a token service provider, the request for the token including the common ID and the transaction amount. The token service provider may receive the request including the common ID and the transaction amount.

In a step 408, the token representing the transaction is generated by the token service provider, the token including an expiration date, a token identifier, and a security context. In some examples, the security context is a security code. The token identifier may be a number that identifies the token and may be in the same format as a credit card or debit card number. In such an example, the token identifier may be a 16 digit number. In some examples, the token identifier is not an actual credit card or debit card number. In such an example, the token identifier may be thought of as a "transactable primary account number" (TPAN) because the token identifier is not an actual credit card or debit card number that can be used as a funding source in and of itself, but is a representation of the transaction and can be used by the merchant to obtain funding for the transaction from the user's linked funding source. Accordingly, companies may be able to adopt techniques disclosed in the present disclosure without modifying their systems. In some examples, the token is replaced with a Cryptogram to provide additional security.

In an example, the security context is in the same format as a CVV (card verification value) or CSC (card security context). In such an example, the security context may be a three digit number. The security context may be dynamic and change with each transaction. In an example, the expiration date is in the MM/YY format.

At a step 410, the token may be linked to the common ID by the token service provider. The token service provider may link the token to the common ID that identifies the user. In such an example, the token service provider is the token service provider that provides a token that is linked to the common ID and that can be understood by the website with which the user is interacting to purchase goods or services from a third-party merchant.

At a step 412, the token is provided by the token service provider to the website. The website may receive the token and process it as if it were a valid credit card or debit card number with its associated information (security context and expiration date). At a step 414, the token is provided by the website to the third-party merchant. The merchant may receive the token and process it accordingly. The token may protect the identity and information of the user because the merchant may be unable to determine the buyer's information. For example, if the user purchases digital content, the merchant may process the token and provide the digital content to the user through the website, without knowing the user's biographical information (e.g., name, mailing address, etc.). If the user purchases a good to be mailed to the user or a service to be performed at the user's residence, the merchant may request this information from the user because this information is not provided in the token. The token may be used as a transactable PAN in order for the merchant to be paid something an item or service.

At a step 416, the token is received at the token service provider, after the website has processed the token. In an example, the merchant may process the token using the token identifier, expiration date, and security context as if it were a funding source, such as it would a real credit card or debit card. The token is eventually routed back to the token service provider because the token identifier is associated with the token service provider.

At a step 418, the common ID that is linked to the token is determined by the token service provider. In an example, the token service provider determines the common ID that is linked to the token. At a step 420, based on information associated with the common ID, it is determined whether the risk of completing the transaction is low. The token service provider may perform a risk analysis to determine whether the transaction may be associated with fraud. In some examples, the token service provider may use the social graph or trigger points based on self-learning algorithmic models constructed for the user to help in determining the risk of the transaction. Accordingly, the token service provider may use the most up-to-date information about the user, the user's habits, the user's location, etc. to determine whether to approve this transaction.

In some examples, the token service provider provides the token to the website, which provides it to the third-party merchant, to be used at most once. The token identifier, expiration date, and security context may be interpreted by the merchant and processed accordingly. If the merchant or website attempts to use the token a second time, the token service provider may fail the transaction and send the website an error message.

If the risk of completing the transaction is low, process flow proceeds to a step 422, in which the funding source linked to the common ID is debited by the transaction amount, and the merchant website's account is credited by the transaction amount. In an example, the token service provider debits the funding source linked to the common ID by the transaction amount, and credits the merchant website's account by the transaction amount. The token service provider may ensure that the entire transaction is completed. In an example, the token service provider pays the merchant and receives payment from the user's funding source. In contrast, if the risk of complete the transaction is not low, process flow proceeds to a step 424, in which the transaction is failed. In an example, the token service provider fails the transaction and sends an error message to the website.

It should be understood that additional processes may be performed before, during, or after steps 402-424 discussed above. It is also understood that one or more of the steps of method 400 described herein may be omitted, combined, or performed in a different sequence as desired.

Figure 5:
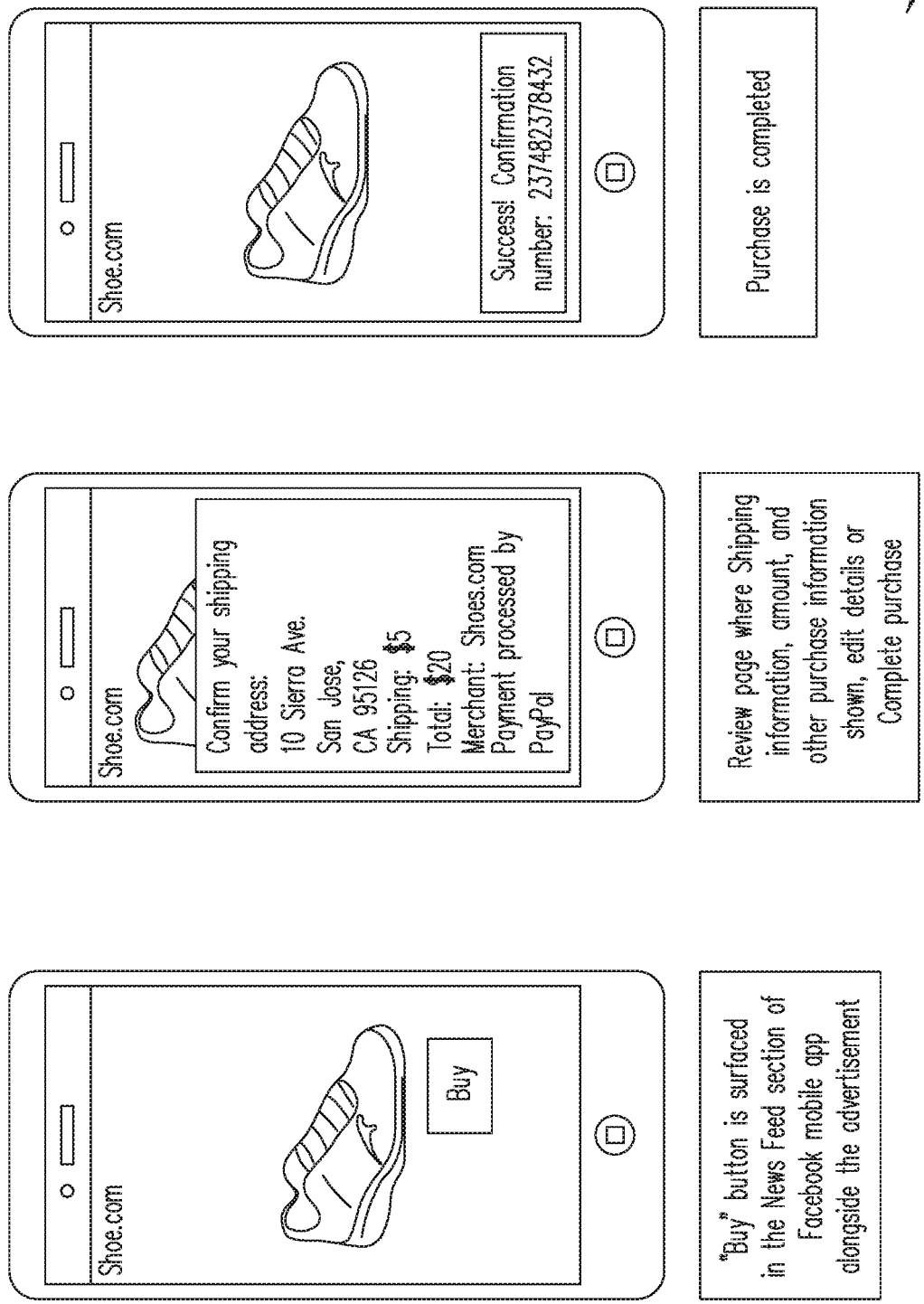
FIG. 5 are example snapshots displayed on a mobile device illustrating the purchase of an item using the financial information linked to the user's account.

FIG. 5 are example snapshots displayed on a mobile device illustrating the purchase of an item using the financial information linked to the user's account.

In some embodiments, the token service provider stores a mapping between the purchase, the financial information (e.g., financial instrument) provided by the user, and the financial instrument provider. The token service provider may map the financial instrument used in the transaction to the asset that the user is attempting to purchase. By doing so, the token service provider may acknowledge that this transaction satisfies Know Your Customer (KYC) requirements. For example, in order of for the user to have received the funding instrument, the user has already gone through the KYC process and the token service provider may leverage this information. Additionally, the token service provider may restrict the user of this funding instrument in areas that are considered high risk. The token service provider may control the transactions in which the user engages in a way that is KYC compliant.

Figure 6:
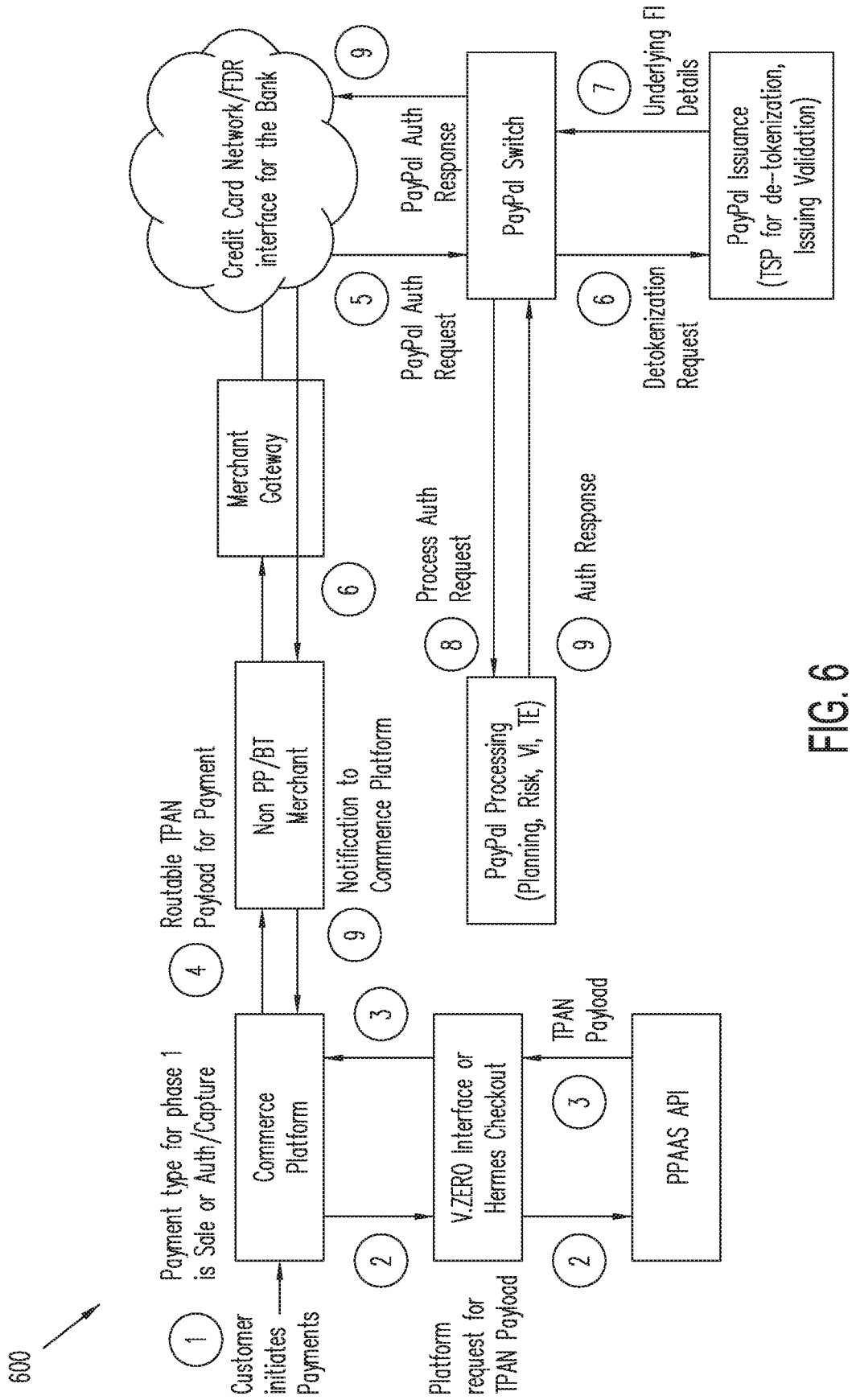
FIG. 6 is a block diagram of an embodiment of a networked system configured to implement a process using a common ID to verify a transaction requested by the user, after the user's account has been linked to the user's financial information

FIG. 6 is a block diagram of an embodiment of a networked system 600 configured to implement a process using a common ID to verify a transaction requested by the user, after the user's account has been linked to the user's financial information. Networked system 600 may include or implement a plurality of servers and/or software components that operate to perform various payment transactions or processes. Exemplary servers may include, for example, stand-alone and enterprise-class servers operating a server operating system (OS) such as a MICROSOFT® OS, a UNIX® OS, a LINUX® OS, or other suitable server-based OS. It can be appreciated that the server illustrated in FIG. 6 may be deployed in other ways and that the operations performed and/or the services provided by such a server may be combined or separated for a given implementation and may be performed by a greater number of servers. One or more servers may be operated and/or maintained by the same or different entities.

Figure 7:
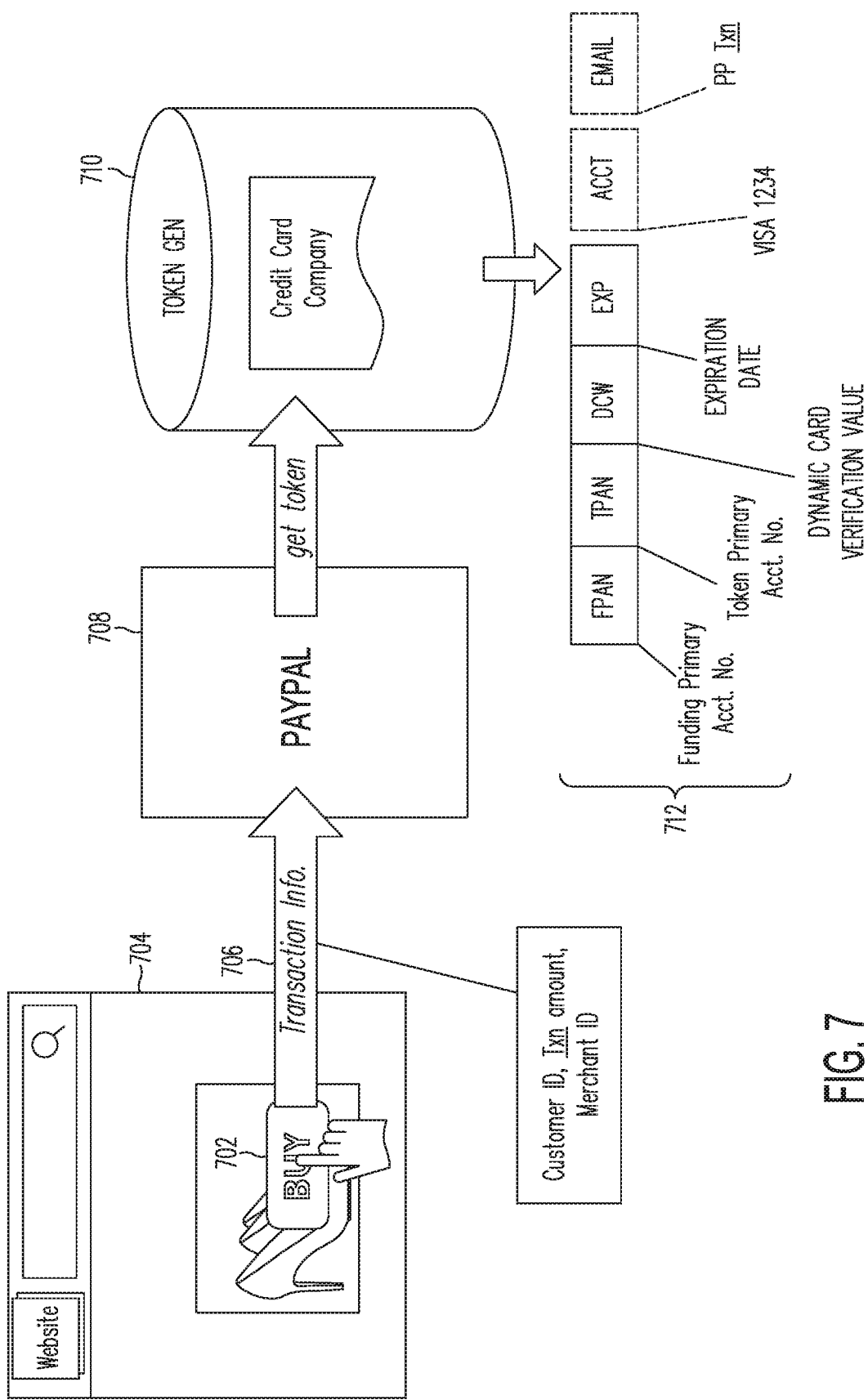
FIG. 7 is an example process flow for providing a token to a website with which the user is interacting to purchase a good from a third party.

FIG. 7 is an example process flow for providing a token to a website on which the user is interacting to purchase a good from a third party. In FIG. 7, a user may select a "Buy" button 702 associated with an item displayed by a webpage 704. The webpage may be associated with a website that receives the user selection to buy the associated item. In response to the user selecting "Buy" button 702, the website may send transaction information 706 to a token service provider 708. In the example illustrated in FIG. 7, token service provider 708 is PayPal. Transaction information 706 may include the customer ID, transaction amount, and merchant ID. Token service provider 708 may request a token from a token generator 710. Token generator 710 may generate tokens specific to particular credit card companies. In response to token service provider 708's request, token generator 710 may generate a token 712 including the user's funding primary account number, token primary account number, dynamic card verification value (e.g., security context), and expiration date. It may be unnecessary for token 712 to include the last four numbers of the user's funding instrument or the user's email address.

Figure 8:
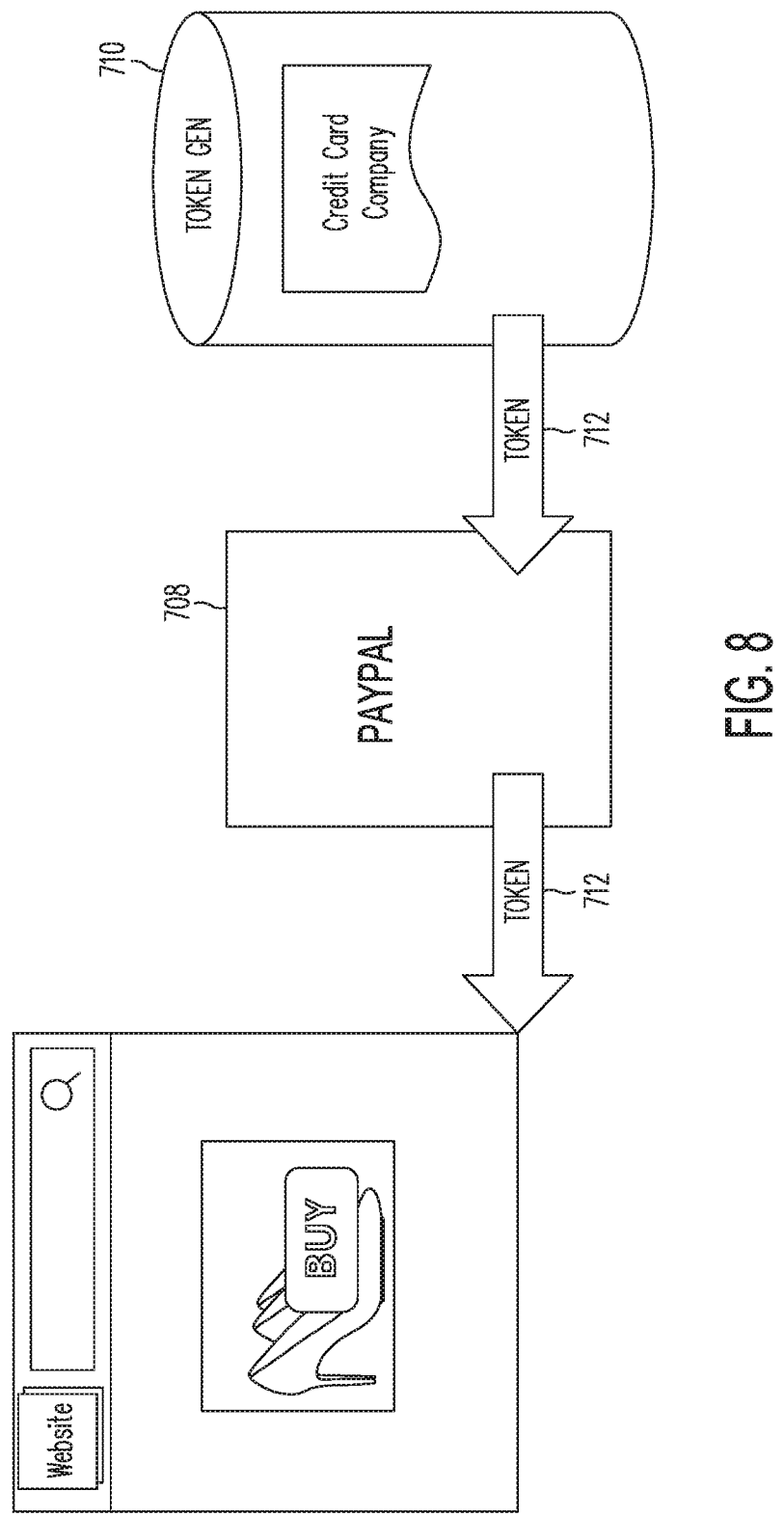
FIG. 8 is an example process flow for providing a token to the website.
Figure 9:
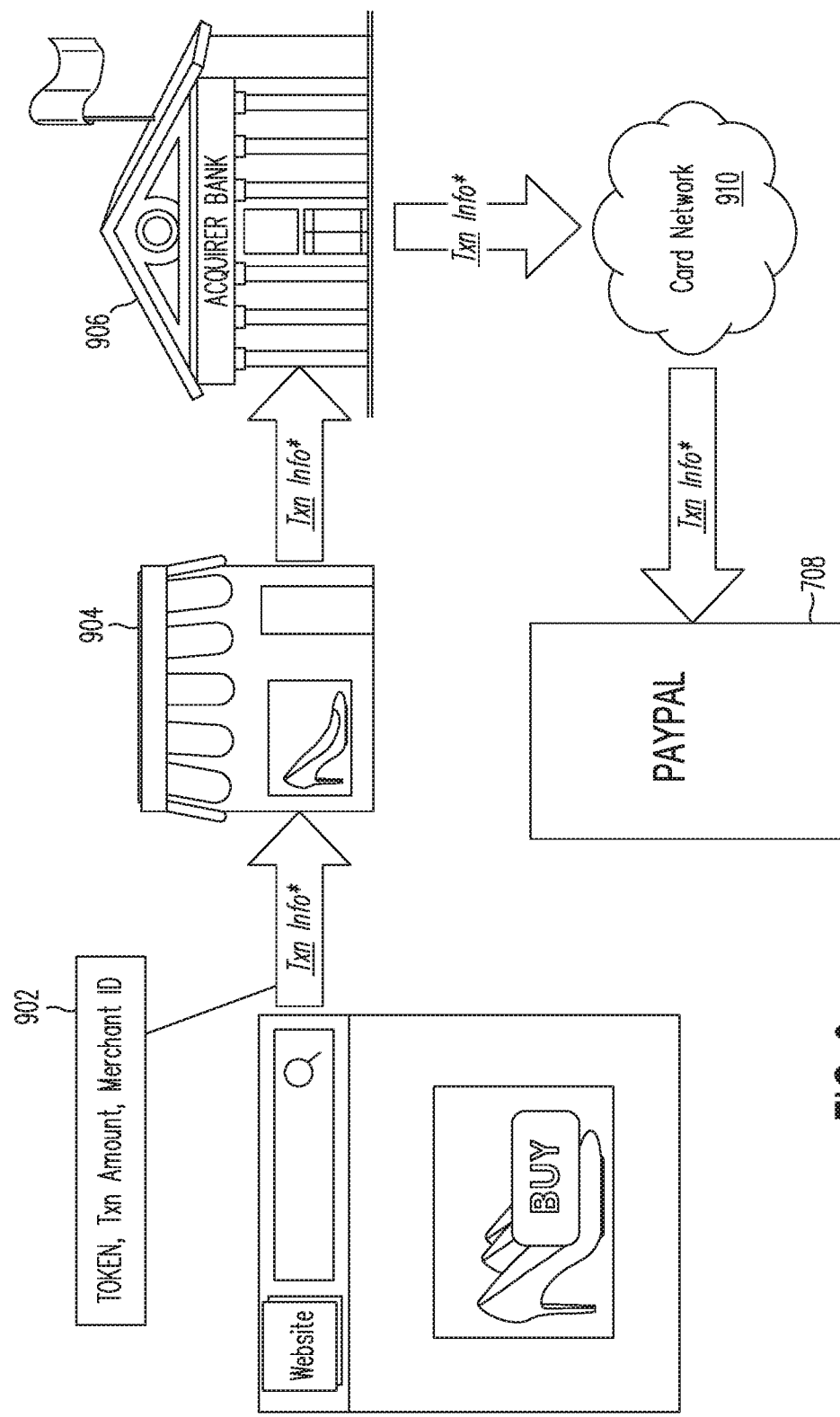
FIG. 9 is an example process flow for providing transaction information to a merchant or website.
Figure 10:
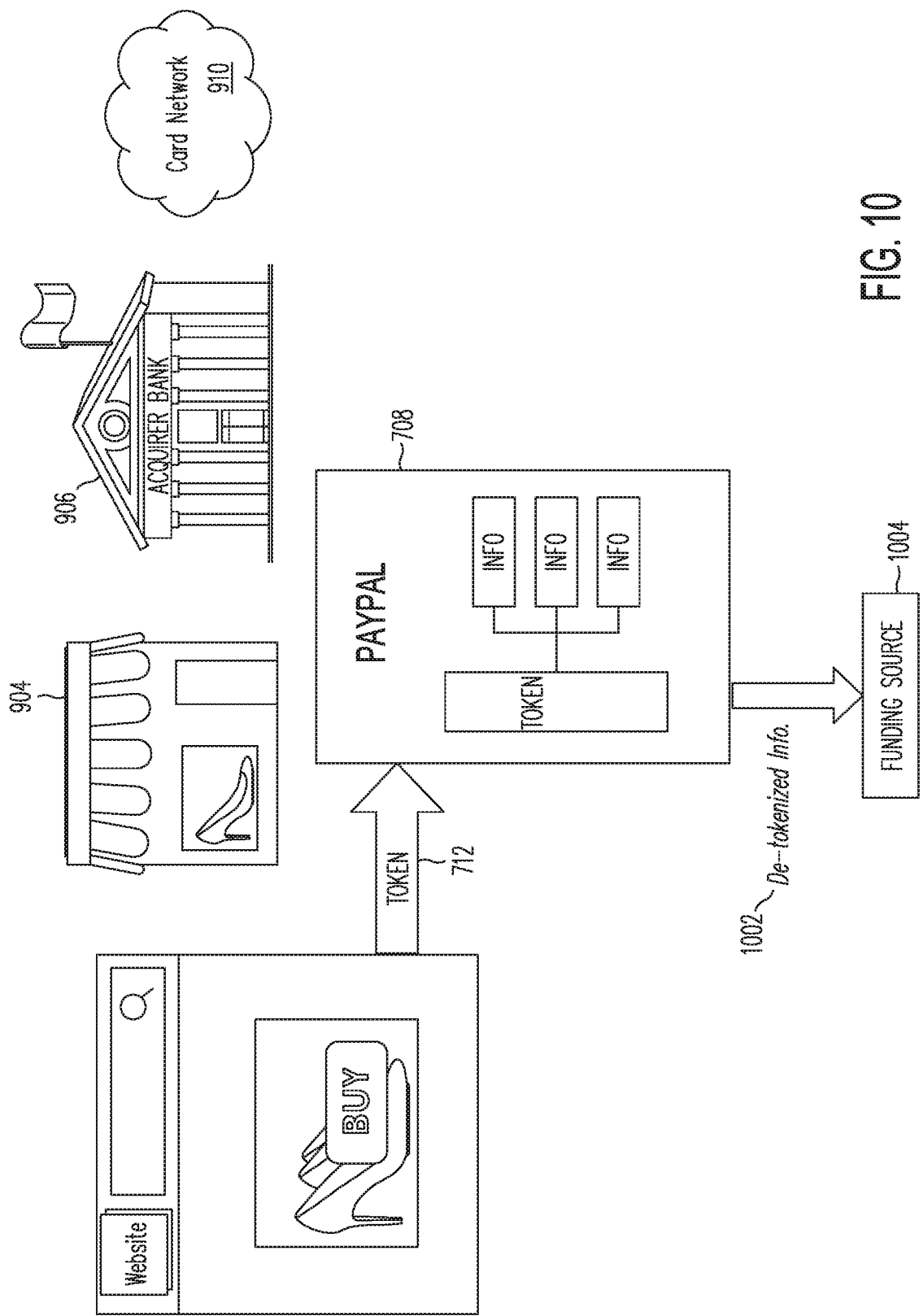
FIG. 10 is a block diagram illustrating the token service provider providing de-tokenized information to a funding source.
Figure 11:
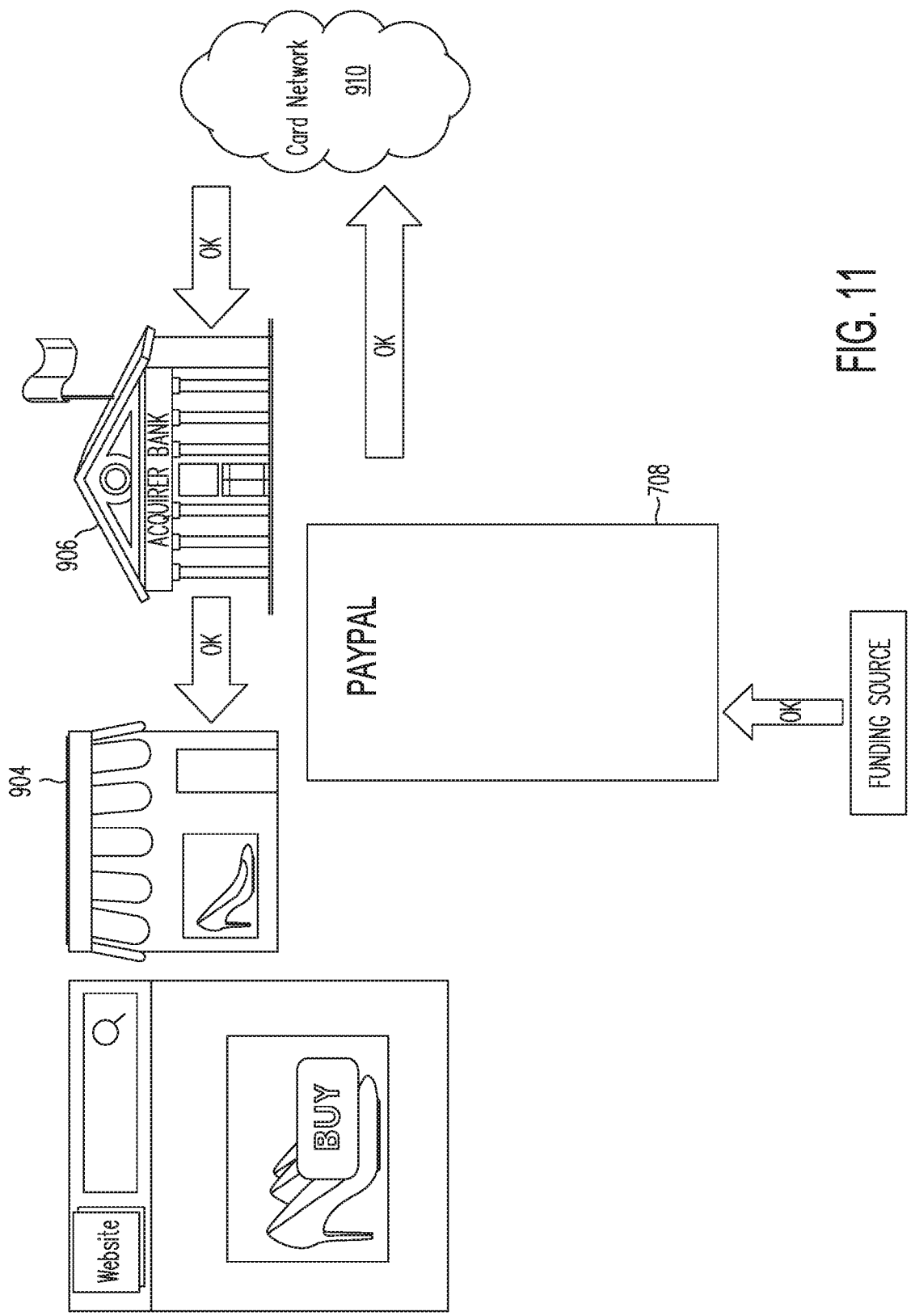
FIG. 11 is an example process flow for providing the transaction amount to the merchant.

FIG. 8 is an example process flow for providing a token to the website. In FIG. 8, token generator 710 provides token 712 to token service provider 708, which then provides token 712 to the website. FIG. 9 is an example process flow for providing transaction information 902 to a merchant or website. In FIG. 9, transaction information 902 includes token 712, the transaction amount, and the merchant ID. The website may provide transaction information 902 to a merchant 904, which then provides transaction information 902 to a bank 906. Bank 906 may then provide transaction information 902 over a card network 910 to token service provider 708. FIG. 10 is a block diagram illustrating token service provider 708 providing de-tokenized information 1002 to a funding source 1004. Additionally, token 712 is provided by the website to token service provider 708. FIG. 11 is an example process flow for providing the transaction amount to merchant 904. If funding source 1004 approves the transaction, funding source 1004 sends an approval to token service provider 708, which then sends an approval over card network 910 to bank 906. Bank 906 then sends the transaction amount to merchant 904, who gets paid.

Figure 12:
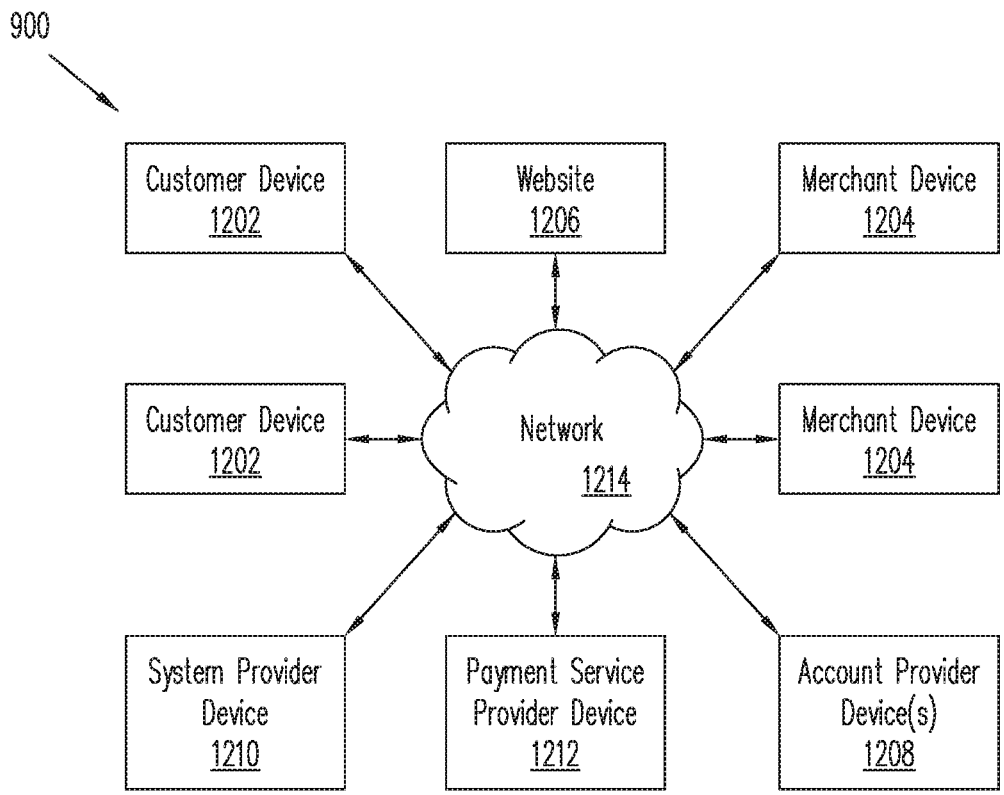
FIG. 12 is a schematic view illustrating an embodiment of a networked system.

Referring now to FIG. 12, an embodiment of a network-based system 1200 for implementing one or more processes described herein is illustrated. As shown, network-based system 1200 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 12 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1200 illustrated in FIG. 12 includes a plurality of user devices 1202, a plurality of merchant devices 1204, a website 1206, a token service provider device 1212, a plurality of account provider devices 1208, and/or a system provider device 1210 in communication over a network 1214. Any of the user devices 1202 may be the user devices, discussed above, and may be operated by the users discussed above. The merchant devices 1204 may be the merchant devices discussed above and may be operated by the merchants discussed above. The token service provider device 1212 may be the token service provider devices discussed above and may be operated by a token service provider such as, for example, PayPal® Inc. of San Jose, Calif. The account provider devices 1208 may be the account provider devices discussed above and may be operated by the account providers discussed above such as, for example, credit card account providers, bank account providers, savings account providers, and a variety of other account providers known in the art. The system provider device 1210 may be the system provider devices discussed above and may be operated by the system providers discussed above. The website 1206 may be social media website with which the user is interacting to buy an item displayed on the website.

The user devices 1202, merchant devices 1204, token service provider device 1212, account provider devices 1208, and/or system provider device 1210 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1200, and/or accessible over the network 1214.

The network 1214 may be implemented as a single network or a combination of multiple networks. For example, in various embodiments, the network 1214 may include the Internet and/or one or more intranets, landline networks, wireless networks, and/or other appropriate types of networks.

The user devices 1202 may be implemented using any appropriate combination of hardware and/or software configured for wired and/or wireless communication over network 1214. For example, in one embodiment, the user devices 1202 may be implemented as a personal computer of a user in communication with the Internet. In other embodiments, the user devices 1202 may be a smart phone, personal digital assistant (PDA), laptop computer, and/or other types of computing devices.

The user devices 1202 may include one or more browser applications which may be used, for example, to provide a convenient interface to permit the user to browse information available over the network 1214. For example, in one embodiment, the browser application may be implemented as a web browser configured to view information available over the Internet.

The user devices 1202 may also include one or more toolbar applications which may be used, for example, to provide user-side processing for performing desired tasks in response to operations selected by the user. In one embodiment, the toolbar application may display a user interface in connection with the browser application.

The user devices 1202 may further include other applications as may be desired in particular embodiments to provide desired features to the user devices 1202. In particular, the other applications may include a payment application for payments assisted by a token service provider through the token service provider device 1212. The other applications may also include security applications for implementing user-side security features, programmatic user applications for interfacing with appropriate application programming interfaces (APIs) over the network 1214, or other types of applications. Email and/or text applications may also be included, which allow the user to send and receive emails and/or text messages through the network 1214. The user devices 1202 may include one or more user and/or device identifiers which may be implemented, for example, as operating system registry entries, cookies associated with the browser application, identifiers associated with hardware of the user devices 1202, or other appropriate identifiers, such as a phone number. In one embodiment, the user identifier may be used by the token service provider device 1212 and/or account provider devices 1208 to associate the user with a particular account as further described herein.

Figure 13:
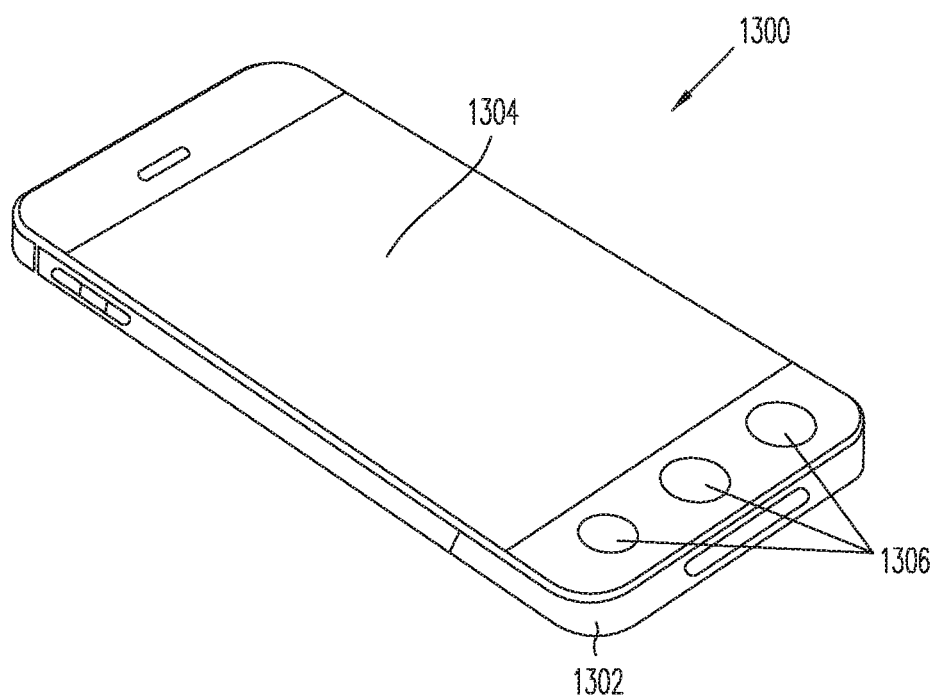
FIG. 13 is a perspective view illustrating an embodiment of a user device.

Referring now to FIG. 13, an embodiment of a user device 1300 is illustrated. The user device 1300 may be any of the user devices discussed above. The user device 1202 includes a chassis 1302 having a display 1304 and an input device including the display 1304 and a plurality of input buttons 1306. The user may use user device 1300 to access and interact with website 1206. One of skill in the art will recognize that the user device 1300 is a portable or mobile phone including a touch screen input device and a plurality of input buttons that allow the functionality discussed above with reference to steps in the methods 100, 300, and 400. However, a variety of other portable/mobile user devices and/or desktop user devices may be used in the methods discussed above with reference to the figures without departing from the scope of the present disclosure.

Figure 14:
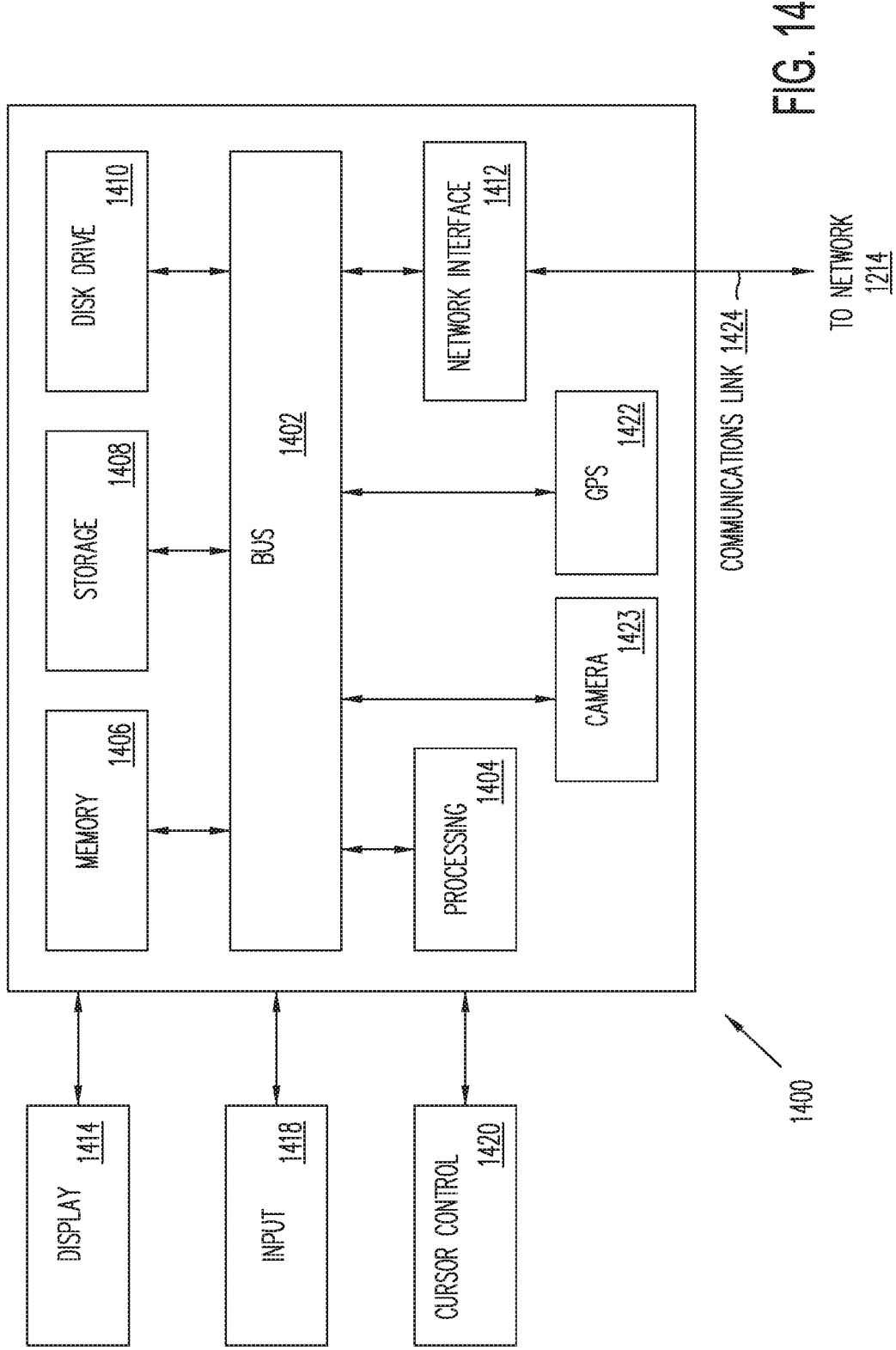
FIG. 14 is a schematic view illustrating an embodiment of a computer system.

Referring now to FIG. 14, an embodiment of a computer system 1400 suitable for implementing, for example, the user devices, the merchant devices, the token service provider device, the account provider devices, and/or the system provider device is illustrated. It should be appreciated that other devices utilized by users, merchants, token service providers, account providers, and/or system providers in the payment system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), and/or a location determination component 1422 (e.g., a Global Positioning System (GPS) device as illustrated, a cell tower triangulation device, and/or a variety of other location determination devices known in the art.) In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the user devices, the merchant devices, the token service provider device, the account provider devices, and/or the system provider device. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
accessing social media information provided by a user on an electronic social media network;
generating, based on the accessing of the social media information, a common identifier for the user, the common identifier being defined as a combination of: an identifier of a merchant, an identifier of the user, and a funding instrument associated with the user, the common identifier indicating a consent of the user for the merchant or an entity associated with the funding instrument to perform one or more activities in one or more predefined environments;
receiving, after the common identifier has been generated, a token associated with a request to complete a first transaction involving the user and the merchant, the request containing a first Global Positioning System (GPS) location of the user at a time the request is received;
determining, based on information associated with the common identifier, whether to approve the first transaction, wherein the determining whether to approve the first transaction comprises:
analyzing one or more postings of the user on the electronic social media network;
determining, based on the analyzing and via a GPS sensor, a second GPS location of the user when the one or more postings of the user were made;
determining whether the first GPS location matches the second GPS location;
determining whether the first transaction is an activity of the one or more activities; and
evaluating a risk of the first transaction in response to a determined match or a mismatch between the first GPS location and the second GPS location and based on the determining whether the first transaction is an activity of the one or more activities;
sending the common identifier to the merchant;
receiving, as a part of a second transaction involving the user and the merchant, the common identifier from the merchant; and
tracking a behavior of the user based on the received common identifier.

2. The system of claim 1, wherein the one or more activities comprise automatically ordering a predefined product from the merchant, automatically downloading a digital good from the merchant, or automatically disclosing an identity of the user to the merchant.

3. The system of claim 1, wherein the common identifier uniquely identifies the user with respect to the electronic social media network, the electronic social media network being different from a network of the merchant.

4. The system of claim 1, wherein the accessing, the generating, the receiving the token, the determining whether to approve the first transaction, the sending the common identifier, the receiving the common identifier, and the tracking are performed by a token service provider that issued the token, and wherein the token is an open loop token that is routable back to the token service provider.

5. The system of claim 1, wherein the accessing, the generating, the receiving the token, the determining whether to approve the first transaction, the sending the common identifier, the receiving the common identifier, and the tracking are performed by a token service provider that issued the token, and wherein the token is a closed loop token that is recognizable by the token service provider.

6. The system of claim 1, wherein the social media information comprises one or more preferences of the user from a social media profile of the user on the electronic social media network.

7. The system of claim 1, wherein the common identifier is generated at least in part based on a username of the user or a password of the user.

8. The system of claim 1, wherein a scope of the token is based on one or more preferences of the merchant.

9. The system of claim 1, wherein a scope of the token is based on one or more preferences of a token service provider that generated the token.

10. A method of verifying a transaction, comprising:
accessing social media information provided by a user on an electronic social media network;
generating, based on the accessing of the social media information, a common identifier for the user, the common identifier being defined as a combination of an identifier of a merchant, an identifier of the user, and a funding instrument associated with the user, the common identifier indicating a consent of the user for the merchant or an entity associated with the funding instrument to perform one or more activities in one or more predefined environments;
receiving, after the common identifier has been generated, a token associated with a request to complete a first transaction involving the user and the merchant, the request containing a first Global Positioning System (GPS) location of the user at a time the request is received;
determining, based on information associated with the common identifier, whether to approve the first transaction, wherein the determining whether to approve the first transaction comprises:
analyzing one or more postings of the user on the electronic social media network;
determining, based on the analyzing and via a GPS sensor, a second GPS location of the user when the one or more postings of the user were made;
determining whether the first GPS location matches the second GPS location;
determining whether the first transaction is an activity of the one or more activities; and
evaluating a risk of the first transaction in response to a determined match or a mismatch between the first GPS location and the second GPS location and to based on the determining whether the first transaction is an activity of the one or more activities;
sending the common identifier to the merchant;

receiving, as a part of a second transaction involving the user and the merchant, the common identifier from the merchant; and tracking a behavior of the user based on the received common identifier.

11. The method of claim 10, wherein the one or more activities comprise automatically ordering a predefined product from the merchant, automatically downloading a digital good from the merchant, or automatically disclosing an identity of the user to the merchant.

12. The method of claim 10, wherein the common identifier uniquely identifies the user with respect to the electronic social media network, the electronic social media network being different from a network of the merchant, wherein the first transaction is initiated based on an engagement of the user with respect to an advertisement displayed on a website of the electronic social media network, and wherein the first transaction is initiated and processed while the user remains on the website of the electronic social media network.

13. The method of claim 10, wherein the accessing, the generating, the receiving the token, the determining whether to approve the first transaction, the sending the common identifier, the receiving the common identifier, and the tracking are performed by a token service provider that issued the token, and wherein the token is an open loop token that is routable back to the token service provider.

14. The method of claim 10, wherein the accessing, the generating, the receiving the token, the determining whether to approve the first transaction, the sending the common identifier, the receiving the common identifier, and the tracking are performed by a token service provider that issued the token, and wherein the token is a closed loop token that is recognizable only by the token service provider.

15. The method of claim 10, wherein the social media information comprises one or more preferences of the user from a social media profile of the user on the electronic social media network.

16. The method of claim 10, wherein the common identifier is generated at least in part based on a username of the user or a password of the user.

17. The method of claim 10, wherein a scope of the token is based on one or more preferences of the merchant.

18. The method of claim 10, wherein a scope of the token is based on one or more preferences of a token service provider that generated the token.

19. A non-transitory machine-readable medium having stored thereon machine-readable instructions executable to cause a machine to perform operations comprising:

accessing social media information provided by a user on an electronic social media network;

generating, based on the accessing of the social media information, a common identifier for the user, the common identifier being defined as a combination of: an identifier of a merchant, an identifier of the user, and a funding instrument associated with the user, the common identifier indicating a consent of the user for the merchant or an entity associated with the funding instrument to perform one or more activities in one or more predefined environments;

receiving, after the common identifier has been generated, a token associated with a request to complete a first transaction involving the user and the merchant, the request containing a first Global Positioning System (GPS) location of the user at a time the request is received;

determining, based on information associated with the common identifier, whether to approve the first transaction, wherein the determining whether to approve the first transaction comprises:

analyzing one or more postings of the user on the electronic social media network;

determining, based on the analyzing and via a GPS unit, a second GPS location of the user when the one or more postings of the user were made;

determining whether the first GPS location matches the second GPS location;

determining whether the first transaction is an activity of the one or more activities; and evaluating a risk of the first transaction in response to a determined match or a mismatch between the first GPS location and the second GPS location and based on the determining whether the first transaction is an activity of the one or more activities;

sending the common identifier to the merchant;

receiving, as a part a second transaction involving the user and the merchant, the common identifier from the merchant; and tracking a behavior of the user based on the received common identifier.

20. The non-transitory machine-readable medium of claim 19, wherein the one or more activities comprise automatically ordering a predefined product from the merchant, automatically downloading a digital good from the merchant, or automatically disclosing an identity of the user to the merchant.

* * * * *